(12) United States Patent
Wang et al.

(10) Patent No.: US 12,415,912 B2
(45) Date of Patent: Sep. 16, 2025

(54) FILLED POLYPROPYLENE (PP) COMPOSITIONS WITH IMPROVED THERMO-MECHANICAL PROPERTIES

(71) Applicant: BOREALIS AG, Vienna (AT)

(72) Inventors: Jingbo Wang, Linz (AT); Simon Schwarzenberger, Linz (AT); Klaus Bernreitner, Linz (AT); Markus Gahleitner, Linz (AT); Ville Virkkunen, Porvoo (FI)

(73) Assignee: BOREALIS AG, Vienna (AT)

( * ) Notice: Subject to any disclaimer, the term of this patent is extended or adjusted under 35 U.S.C. 154(b) by 149 days.

(21) Appl. No.: 16/754,504

(22) PCT Filed: Oct. 22, 2018

(86) PCT No.: PCT/EP2018/078827
§ 371 (c)(1),
(2) Date: Apr. 8, 2020

(87) PCT Pub. No.: WO2019/081394
PCT Pub. Date: May 2, 2019

(65) Prior Publication Data
US 2020/0392318 A1 Dec. 17, 2020

(30) Foreign Application Priority Data
Oct. 25, 2017 (EP) ...................................... 17198353

(51) Int. Cl.
*C08L 23/12* (2006.01)
*C08K 3/22* (2006.01)
*C08K 3/30* (2006.01)
*C08K 3/34* (2006.01)
*C08K 5/523* (2006.01)

(52) U.S. Cl.
CPC ................ *C08L 23/12* (2013.01); *C08K 3/22* (2013.01); *C08K 3/30* (2013.01); *C08K 3/346* (2013.01); *C08K 5/523* (2013.01); *C08K 2003/2224* (2013.01); *C08K 2003/3063* (2013.01); *C08K 2201/003* (2013.01); *C08K 2201/006* (2013.01); *C08L 2205/24* (2013.01)

(58) Field of Classification Search
None
See application file for complete search history.

(56) References Cited

U.S. PATENT DOCUMENTS

| | | | |
|---|---|---|---|
| 9,738,772 B2 * | 8/2017 | Lorgouilloux | C09K 21/02 |
| 10,941,288 B2 * | 3/2021 | Mileva | C08L 23/30 |
| 2004/0044106 A1 * | 3/2004 | Portnoy | C08K 5/0083 |
| | | | 524/136 |
| 2008/0249248 A1 * | 10/2008 | Thurman | C08L 23/10 |
| | | | 525/240 |
| 2010/0004384 A1 * | 1/2010 | Itakura | C08L 23/12 |
| | | | 525/240 |
| 2014/0329945 A1 * | 11/2014 | Tranninger | C08L 23/12 |
| | | | 524/451 |

FOREIGN PATENT DOCUMENTS

| | | | | |
|---|---|---|---|---|
| CN | 104066782 A | 9/2014 | | |
| CN | 104718249 A | 6/2015 | | |
| CN | 105722872 A | 6/2016 | | |
| CN | 106459536 A | 2/2017 | | |
| CN | 106795346 A | 5/2017 | | |
| CN | 106977815 A | 7/2017 | | |
| CN | 107075206 A | 8/2017 | | |
| EA | 0016440 A1 | 6/2009 | | |
| EP | 2731989 B1 * | 6/2015 | ............. | C08L 23/10 |
| EP | 2947118 A1 * | 11/2015 | ............. | C08F 210/06 |
| EP | 3015503 A1 * | 5/2016 | ............. | C08F 2/001 |
| EP | 3124537 A1 | 2/2017 | | |
| JP | 2009114249 A * | 5/2009 | | |
| JP | 2017014403 A | 1/2017 | | |
| RU | 2337114 C2 | 10/2008 | | |
| RU | 2506287 C2 | 2/2014 | | |
| WO | 9414856 A1 | 7/1994 | | |
| WO | 9512622 A1 | 5/1995 | | |
| WO | 03051934 A2 | 6/2003 | | |
| WO | 2006069733 A1 | 7/2006 | | |
| WO | 2006097497 A1 | 9/2006 | | |
| WO | 2010052260 A1 | 5/2010 | | |
| WO | 2010052263 A1 | 5/2010 | | |
| WO | 2010052264 A1 | 5/2010 | | |
| WO | 2013007650 A1 | 1/2013 | | |
| WO | WO-2013010877 A1 * | 1/2013 | ............. | C08L 23/10 |

(Continued)

OTHER PUBLICATIONS

WO-2013010877-A1, Jan. 2013, Machine Translation (Year: 2013).*

(Continued)

*Primary Examiner* — Satya B Sastri
(74) *Attorney, Agent, or Firm* — Tarolli, Sundheim, Covell &Tummino LLP

(57) ABSTRACT

The present application relates to a polypropylene (PP) composition comprising a) 50.0 to 95.0 wt.-%, based on the total weight of the polypropylene (PP) composition, of a polypropylene (PP) homopolymer being polymerized in the presence of a single-site catalyst and b) 5.0 to 50.0 wt.-%, based on the total weight of the polypropylene (PP) composition, of a mineral filler, to an article comprising the polypropylene (PP) composition as well as the use of the polypropylene (PP) composition for improving the thermo-mechanical properties.

11 Claims, No Drawings

(56) References Cited

FOREIGN PATENT DOCUMENTS

| WO | WO-2014082188 A1 * | 6/2014 | ............... C08K 3/34 |
| WO | 2017/021292 A1 | 2/2017 | |

OTHER PUBLICATIONS

JP-2009114249-A, May 2009, Machine translation (Year: 2009).*
Busico, et al. "Alk-1-ene Polymerization in the Presence of a Monocyclopentadienyl Zirconium(IV) Acetamidinate Catalyst: Microstructural and Mechanistic Insights" Macromolecular Rapid Communications, Macromol. Rapid Commun. 2007, 28, 1128-1134.
Cheng, "C NMR Analysis of Ethylene-Propylene Rubbers", Hercules Incorporated, Research Center, Wilmington, Delaware 19894.
Kakugo, et al., "C NMR Determination of Monomer Sequence Distribution in Ethylene-Propylene Copolymers Prepared with 6-TIC13-Al(C2H5)2C1", Macromolecules 1982,15, 1150-1152.
Resconi, et al., "Selectivity in Propene Polymerization with Metallocene Catalysts", Chemical Reviews, 2000, vol. 100, No. 4, 1253-1345.
Wang, et al., "Structural Analysis of Ethylene/Propylene Copolymers Synthesized with a Constrained Geometry Catalyst", Macromolecules, vol. 33, No. 4, 2000, 1157-1162.
Zhou, et al., "A new decoupling method for accurate quantification of polyethylene copolymer composition and triad sequence distribution with 13C NMR", Journal of Magnetic Resonance 187 (2007) 225-233.
"Plastic Additives Handbook", 5th edition, 2001 of Hans Zweifel—5th edition not available, link to 6th edition provided below. http://archives.getty.edu:30008/getty_images/digitalresources/edocs/9783446408012.pdf.
ISO 1133-1 "Plastics—Determination of the melt mass-flow rate (MFR) and melt volume-flow rate (MVR) of thermoplastics" Preview.
ISO 13317-3 "Determination of particle size distribution by gravitational liquid sedimentation methods" (2001).
ISO 294-1 "Plastics—Injection moulding of test specimens of thermoplastic materials—Part 1: Gerneral prinicples, and moulding of multipurpose and bar test specimens" (1996) Abstract.
ISO 11357-3 "Plastics—Differential scanning calorimerty (DSC)—Part 3: Determination of temperature and enthalpy of melting and crystallization" (2018) Preview.
ISO 16152 "Plastics—Determination of xylene-soluble matter in polypropylene" (2005) Abstract.
ISO 1628-4 "Plastics—Determination of the viscosity of polymers in dilute solution using capillary viscometers" (1999) Abstract.
Singh, et al., "Triad sequence determination of ethylene-propylene copolymers—application of quantitative 13C NMR" Polymer Testing, vol. 28, Issue 5, Aug. 2009, pp. 475-479.
Applicant: Borealis AG; Russian application No. 2020112837/04(021720), Filed Oct. 22, 2018; Russian Office Action dated Mar. 19, 2021; 12 pgs.
Ivanyukov D.V. et al., Polypropylene, Moskva, Khimia, 1974, 2 pgs.
Russian Search Report dated Oct. 22, 2020.
Russian Office Action dated Oct. 27, 2020.
Applicant: Borealis AG; "Filled Polypropylene (PP) Composition with Improved Thermo-Mechanical Properties"; Chinese Application No. 201880065363.X; Chinese Office Action Issued Sep. 15, 2021; 17 pgs.
Applicant: Borealis AG; European Application No. 17198353.9; European Office Action Issued May 27, 2022; 3 pgs.
Brazilian Application No. BR112020004537-3, Office Action dated Dec. 10, 2023.

* cited by examiner

FILLED POLYPROPYLENE (PP) COMPOSITIONS WITH IMPROVED THERMO-MECHANICAL PROPERTIES

The present application relates to a polypropylene (PP) composition comprising a) 50.0 to 95.0 wt.-%, based on the total weight of the polypropylene (PP) composition, of a polypropylene (PP) homopolymer being polymerized in the presence of a single-site catalyst and b) 5.0 to 50.0 wt.-%, based on the total weight of the polypropylene (PP) composition, of a mineral filler, to an article comprising the polypropylene (PP) composition as well as the use of the polypropylene (PP) composition for improving the thermo-mechanical properties.

Polypropylene is used in many applications and is for instance the material of choice in the field of automotive applications because they can be tailored to specific purposes needed. In automotive applications, it is specifically desired to combine high stiffness and high thermal resistance. Furthermore, lower emissions, fogging and odour (EFO) levels are desired on top of mechanical properties. However, state of the art polypropylene (PP) compositions are typically prepared in the presence of Ziegler-Natta catalysts and thus suffer from different disadvantages. For example, due to the nature of the catalyst, significant amounts of oligomers are produced such that odour (EFO) levels are very critical nowadays. One of the known technologies for overcoming this drawback is to use some post reactor modification technology, like aeration, which may reduce the amount of volatiles drastically. However, these methods have several drawbacks: First of all, additional energy is consumed as the pellets or finished part are treated at rather high temperature, meaning extra energy in heating and cooling process is required and extra cost results from this. On top, this process takes some time, and thus reduces the efficiency. Furthermore, these methods have some limits in the odour (EFO) removal, being most efficient in low molecular weight tails. Another known technology is producing high purity base polymers from the beginning, e.g. using single site catalysts (SSC) to produce PP. However, due to the limits of some SSC, most of the so far disclosed polymers show reduced stiffness and melting temperature.

As a result, polypropylene (PP) compositions providing high stiffness in combination with high thermal resistance are still desired. Furthermore, it is desired that these polypropylene (PP) compositions provide low emissions, fogging and odour (EFO) levels.

The finding of the present invention is that a polypropylene (PP) composition having high stiffness and high thermal resistance can be obtained with a specific polypropylene (PP) homopolymer in combination with a defined mineral filler.

Therefore the present invention is directed to a polypropylene (PP) composition comprising
a) 50.0 to 95.0 wt.-%, based on the total weight of the polypropylene (PP) composition, of a polypropylene (PP) homopolymer being polymerized in the presence of a single-site catalyst and having
   i) a melt flow rate $MFR_2$ (230° C.) measured according to ISO 1133 in the range of 1 to 200 g/10 min, and
   ii) a melting temperature ($T_m$) measured by differential scanning calorimetry (DSC) of ≥153° C., and
b) 5.0 to 50.0 wt.-%, based on the total weight of the polypropylene (PP) composition, of a mineral filler.

According to one embodiment of the present invention, the polypropylene (PP) homopolymer is unimodal and/or has a molecular weight distribution Mw/Mn measured according to ISO 16014 in the range of 1.5 to 4.5, preferably in the range from 2.0 to 4.0, and more preferably in the range from 2.5 to 4.0.

According to another embodiment of the present invention, the polypropylene (PP) homopolymer has a) a melt flow rate $MFR_2$ (230° C.) measured according to ISO 1133 in the range of 2 to 100 g/10 min, preferably from 2.2 to 50 g/10 min, and/or b) a melting temperature ($T_m$) measured by differential scanning calorimetry (DSC) in the range from 153 to 165° C., preferably in the range from 153 to 163° C., and/or c) a heat deflection temperature HDT B measured in accordance with ISO 75 at a load of 0.46 MPa of at least 90° C., preferably in the range from 90 to 100° C.

According to yet another embodiment of the present invention, the polypropylene (PP) homopolymer has a) a xylene cold soluble fraction (XCS) determined at 23° C. according ISO 16152 of equal or below 2.0 wt.-%, and/or b) a weight average molecular weight (Mw) measured according to ISO 16014 in the range from 80 to 500 kg/mol, and/or c) an isotactic triad fraction (mm) determined from $^{13}$C-NMR spectroscopy of at least 98.0%, and/or d) a content of <2,1> erythro regiodefects as determined from $^{13}$C-NMR spectroscopy in the range from 0.10 to 1.00 mol.-%.

According to one embodiment of the present invention, the polypropylene (PP) homopolymer has a flexural modulus measured according to ISO 178 of at least 1300 MPa, preferably in the range from 1300 to 2200 MPa.

According to another embodiment of the present invention, the mineral filler is an anisotropic mineral filler, preferably a mineral filler selected from the group comprising talc, wollastonite, mica, montmorillonite, magnesium sulfate, magnesium hydroxide, halloysite and mixtures thereof.

According to yet another embodiment of the present invention, the mineral filler has a particle size $d_{50}$ in the range from 0.1 to 10 µm, preferably in the range from 0.2 to 6.0 µm, more preferably in the range from 0.3 to 4.0 µm.

According to yet another embodiment of the present invention, the polypropylene (PP) composition further comprises a nucleating agent in an amount in the range from 0.002 to 1.5 wt.-%, based on the total weight of the polypropylene (PP) composition.

According to one embodiment of the present invention, the nucleating agent is a α-nucleating agent, preferably a phosphate-based α-nucleating agent.

According to another embodiment of the present invention, the polypropylene (PP) composition has a) a melt flow rate $MFR_2$ (230° C.) measured according to ISO 1133 in the range of 0.5 to 175 g/10 min, preferably in the range from 1.0 to 90 g/10 min, and/or
b) a melting temperature ($T_m$) measured by differential scanning calorimetry (DSC) in the range from 154 to 165° C., preferably in the range from 155 to 163° C., and/or
c) a crystallization temperature ($T_c$) measured by differential scanning calorimetry (DSC) in the range from 120 to 135° C., preferably in the range from 122 to 132° C., and/or
d) a flexural modulus measured according to ISO 178 in the range from 2700 to 6500 MPa, preferably in the range from 2750 to 6000 MPa, and/or
e) a heat deflection temperature (HDT) measured according to ISO 75 A at a load of 1.8 MPa in the range from 76 to 95° C., preferably in the range from 77 to 92° C.

According to yet another embodiment of the present invention, the polypropylene (PP) composition has a ratio of melting temperature ($T_m$) measured by differential scanning calorimetry (DSC) to heat deflection temperature (HDT)

measured according to ISO 75 A [Tm/HDT] of ≤2.0, preferably in the range from 1.5 to 2.0.

According to a further aspect, the present invention refers to an article comprising the polypropylene (PP) composition as defined herein. It is preferred that the article is an automotive interior article.

According to another aspect, the present invention refers to the use of a polypropylene (PP) composition as defined herein for improving the thermo-mechanical properties, wherein the improvement is achieved if the polypropylene (PP) composition has a ratio of melting temperature ($T_m$) measured by differential scanning calorimetry (DSC) to heat deflection temperature (HDT) measured according to ISO 75 A [Tm/HDT] of ≤2.0, preferably in the range from 1.5 to 2.0.

In the following the invention is defined in more detail.

The Polypropylene (PP) Composition

The polypropylene (PP) composition according to this invention comprises a specific polypropylene (PP) homopolymer (H-PP) and a mineral filler.

Accordingly, it is appreciated that the polypropylene (PP) composition comprises
 a) 50.0 to 95.0 wt.-%, preferably from 55.0 to 92.0 wt.-%, like in the range of 60.0 to 90.0 wt.-%, based on the total weight of the polypropylene (PP) composition, of a polypropylene (PP) homopolymer being polymerized in the presence of a single-site catalyst and having
  i) a melt flow rate $MFR_2$ (230° C.) measured according to ISO 1133 in the range of 1 to 200 g/10 min, and
  ii) a melting temperature ($T_m$) measured by differential scanning calorimetry (DSC) of ≥153° C., and
 b) 5.0 to 50.0 wt.-%, preferably from 8.0 to 45.0 wt.-%, like in the range of 10.0 to 40.0 wt.-%, based on the total weight of the polypropylene (PP) composition, of a mineral filler.

In a preferred embodiment, the polypropylene (PP) composition according to this invention does not comprise (a) further polymer(s) different to the polymer present in the polypropylene (PP) composition, i.e. different to the polypropylene (PP) homopolymer, in an amount exceeding in total 2.0 wt.-%, preferably exceeding in total 1.0 wt.-%, based on the total weight of the polypropylene (PP) composition. Typically if an additional polymer is present, such a polymer is a carrier polymer for additives and thus does not contribute to the improved properties of the claimed polypropylene (PP) composition.

Accordingly in one embodiment the polypropylene (PP) composition consists of the polypropylene (PP) homopolymer, the mineral filler and optional other additives, which might contain in low amounts of polymeric carrier material. However, this polymeric carrier material is not more than 2.0 wt.-%, preferably not more than 1.0 wt.-%, based on the total weight of the polypropylene (PP) composition, present in said polypropylene (PP) composition.

In one embodiment, it is thus preferred that the polypropylene (PP) composition comprises, more preferably consists of,
 a) 50.0 to 95.0 wt.-%, based on the total weight of the polypropylene (PP) composition, of a polypropylene (PP) homopolymer being polymerized in the presence of a single-site catalyst and having
  i) a melt flow rate $MFR_2$ (230° C.) measured according to ISO 1133 in the range of 1 to 200 g/10 min,
  ii) a melting temperature ($T_m$) measured by differential scanning calorimetry (DSC) of ≥153° C., and
 b) 5.0 to 50.0 wt.-%, based on the total weight of the polypropylene (PP) composition, of a mineral filler, and
 c) optionally up to 2.0 wt.-%, based on the total weight of the polypropylene (PP) composition, of one or more additives.

The term "additives" covers also additives which are provided as a masterbatch containing the polymeric carrier material as discussed above. However the term "additive" does not cover nucleating agents, e.g. α-nucleating agents. Typical additives are acid scavengers, colorants, pigments such as carbon black, anti-scratch agents, dispersing agents, UV stabilizers, antistatic agents, demoulding agents and carriers.

In addition thereto, the polypropylene (PP) composition contains preferably a nucleating agent, more preferably a α-nucleating agent. Even more preferred the polypropylene (PP) composition according to the present invention is free of β-nucleating agents. Accordingly, the nucleating agent is preferably selected from the group consisting of
 (i) salts of monocarboxylic acids and polycarboxylic acids, e.g. sodium benzoate or aluminum tert-butylbenzoate, and
 (ii) dibenzylidenesorbitol (e.g. 1,3: 2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
 (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
 (iv) vinylcycloalkane polymer and vinylalkane polymer, and
 (v) mixtures thereof.

Preferably, the α-nucleating agent is a phosphate-based α-nucleating agent. More preferably, the α-nucleating agent is aluminium-hydroxy-bis[2,2'-methylene-bis(4,6-di-t-butylphenyl)phosphate].

It is appreciated that the polypropylene (PP) composition preferably comprises the nucleating agent in an amount in the range from 0.002 to 1.5 wt.-%, e.g. from 0.01 to 1.0 wt.-%, based on the total weight of the polypropylene (PP) composition.

In view of this, the polypropylene (PP) composition preferably comprises, more preferably consists of,
 a) 50.0 to 95.0 wt.-%, based on the total weight of the polypropylene (PP) composition, of a polypropylene (PP) homopolymer being polymerized in the presence of a single-site catalyst and having
  i) a melt flow rate $MFR_2$ (230° C.) measured according to ISO 1133 in the range of 1 to 200 g/10 min,
  ii) a melting temperature ($T_m$) measured by differential scanning calorimetry (DSC) of ≥153° C., and
 b) 5.0 to 50.0 wt.-%, based on the total weight of the polypropylene (PP) composition, of a mineral filler,
 c) optionally up to 2.0 wt.-%, based on the total weight of the polypropylene (PP) composition, of one or more additives, and
 d) optionally from 0.002 to 1.5 wt.-%, based on the total weight of the polypropylene (PP) composition, of a nucleating agent.

Such additives and nucleating agents are generally commercially available and are described, for example, in "Plastic Additives Handbook", 5th edition, 2001 of Hans Zweifel.

Preferably the polypropylene (PP) composition has a melt flow rate $MFR_2$ (230° C., 2.16 kg) measured according to ISO 1133 in the range from 0.5 to 175 g/10 min, more preferably in the range from 1.0 to 90 g/10 min, like in the range from 2.0 to 45 g/10 min.

In a preferred embodiment, the polypropylene (PP) composition has a) a melt flow rate MFR$_2$ (230° C., 2.16 kg) measured according to ISO 1133 in the range from 0.5 to 175 g/10 min, more preferably in the range from 1.0 to 90 g/10 min, like in the range from 2.0 to 45 g/10 min, and/or b) a melting temperature ($T_m$) measured by differential scanning calorimetry (DSC) in the range from 154 to 165° C., more preferably in the range from 155 to 163° C., and/or c) a crystallization temperature (TO measured by differential scanning calorimetry (DSC) in the range from 120 to 135° C., more preferably in the range from 122 to 132° C., and/or d) a flexural modulus measured according to ISO 178 in the range from 2700 to 6500 MPa, preferably in the range from 2750 to 6000 MPa, and/or e) a heat deflection temperature (HDT) measured according to ISO 75 A at a load of 1.8 MPa in the range from 76 to 95° C., preferably in the range from 77 to 92° C.

For example, the polypropylene (PP) composition has a) a melt flow rate MFR$_2$ (230° C., 2.16 kg) measured according to ISO 1133 in the range from 0.5 to 175 g/10 min, more preferably in the range from 1.0 to 90 g/10 min, like in the range from 2.0 to 45 g/10 min, or b) a melting temperature ($T_m$) measured by differential scanning calorimetry (DSC) in the range from 154 to 165° C., more preferably in the range from 155 to 163° C., or c) a crystallization temperature (TO measured by differential scanning calorimetry (DSC) in the range from 120 to 135° C., more preferably in the range from 122 to 132° C., or d) a flexural modulus measured according to ISO 178 in the range from 2700 to 6500 MPa, preferably in the range from 2750 to 6000 MPa, or e) a heat deflection temperature (HDT) measured according to ISO 75 A at a load of 1.8 MPa in the range of from 76 to 95° C., preferably in the range from 77 to 92° C.

Alternatively, the polypropylene (PP) composition has a) has a melt flow rate MFR$_2$ (230° C., 2.16 kg) measured according to ISO 1133 in the range from 0.5 to 175 g/10 min, more preferably in the range from 1.0 to 90 g/10 min, like in the range from 2.0 to 45 g/10 min, and b) a melting temperature ($T_m$) measured by differential scanning calorimetry (DSC) in the range from 154 to 165° C., more preferably in the range from 155 to 163° C., and c) a crystallization temperature (TO measured by differential scanning calorimetry (DSC) in the range from 120 to 135° C., more preferably in the range from 122 to 132° C., and d) a flexural modulus measured according to ISO 178 in the range from 2700 to 6500 MPa, preferably in the range from 2750 to 6000 MPa, and e) a heat deflection temperature (HDT) measured according to ISO 75 A at a load of 1.8 MPa in the range of from 76 to 95° C., preferably in the range from 77 to 92° C.

It is appreciated that the polypropylene (PP) composition has an advantageous relation between melting temperature ($T_m$) and heat deflection temperature (HDT). Thus, it is preferred that the polypropylene (PP) composition has a ratio of melting temperature (Tm) measured by differential scanning calorimetry (DSC) to heat deflection temperature (HDT) measured according to ISO 75 A [Tm/HDT] of ≤2.0.

In a preferred embodiment, the polypropylene (PP) composition has a ratio of melting temperature ($T_m$) measured by differential scanning calorimetry (DSC) to heat deflection temperature (HDT) measured according to ISO 75 A [Tm/HDT] in the range from 1.5 to 2.0. It is to be noted that the ratio is preferably obtained at a content of mineral filler of about 25 wt.-%, based on the total weight of the polypropylene (PP) composition.

In one embodiment, the polypropylene (PP) composition has a heat deflection temperature (HDT) measured according to ISO 75 B at a load of 0.46 MPa in the range from 110 to 145° C., more preferably in the range from 112 to 140° C.

The polypropylene (PP) composition according to the invention may be compounded and pelletized using any of the variety of compounding and blending machines and methods well known and commonly used in the resin compounding art.

For blending the individual components of the instant polypropylene (PP) composition a conventional compounding or blending apparatus, e.g. a Banbury mixer, a 2-roll rubber mill, Buss-co-kneader or a twin screw extruder may be used. The polypropylene (PP) compositions recovered from the extruder/mixer are usually in the form of pellets. These pellets are then preferably further processed, e.g. by injection molding to generate articles and products of the inventive composition.

In the following, the individual components of the polypropylene (PP) composition are described in more detail.

The Polypropylene (PP) Homopolymer

The polypropylene (PP) composition must comprise a polypropylene (PP) homopolymer in amounts from 50.0 to 95.0 wt.-%, based on the total weight of the polypropylene (PP) composition. Preferably, the polypropylene (PP) composition comprises the polypropylene (PP) homopolymer in amounts from 55.0 to 92.0 wt.-%, like in the range of 60.0 to 90.0 wt.-%, based on the total weight of the polypropylene (PP) composition.

It is appreciated that the polypropylene (PP) homopolymer has a melt flow rate MFR$_2$ (230° C., 2.16 kg) measured according to ISO 1133 in the range from 1 to 200 g/10 min.

The polypropylene (PP) homopolymer may consist of a single polypropylene (PP) homopolymer. Alternatively, the polypropylene (PP) homopolymer contains a mixture of at least two different polyopylene homopolymers.

It is appreciated that the expression "mixture of at least two polypropylene (PP) homopolymers" means that two or more kinds of said polypropylene (PP) homopolymers are present in the instant composition.

Accordingly, it should be noted that the mixture of at least two polypropylene (PP) homopolymers can be a mixture of two kinds of said polypropylene (PP) homopolymers. Alternatively, the mixture of at least two polypropylene (PP) homopolymers (H-PP) can be a mixture of three or more kinds of said polypropylene (PP) homopolymers (H-PP), like three kinds of said polypropylene (PP) homopolymers. For example, the mixture of at least two polypropylene (PP) homopolymers comprises two polypropylene (PP) homopolymers.

If the mixture of at least two polypropylene (PP) homopolymers comprises two polypropylene (PP) homopolymers, it is preferred that the mixture comprises the two polypropylene (PP) homopolymers in a weight ratio from 5:1 to 1.2:1. For example, the mixture comprises the two polypropylene (PP) homopolymers in a weight ratio from 3:1 to 1.5:1 or from 2.5:1 to 1.8:1. Most preferably, the mixture comprises the two rpolypopylene homopolymers in a weight ratio from 2.5:1 to 2:1.

Preferably, the polypropylene (PP) homopolymer consists of a single polypropylene (PP) homopolymer.

It is appreciated that the polypropylene (PP) homopolymer can be unimodal or multimodal, like bimodal. However, it is preferred that the polypropylene (PP) homopolymer is unimodal.

The expression "unimodal" as used herein refers to the modality of the polymer, i.e. the form of its molecular weight distribution curve, which is the graph of the molecular weight fraction as a function of its molecular weight.

When the polypropylene (PP) homopolymer is unimodal with respect to the molecular weight distribution, it may be prepared in a single stage process e.g. as slurry or gas phase process in a slurry or gas phase reactor. Preferably, the unimodal polypropylene (PP) homopolymer is polymerized in a slurry polymerization. Alternatively, the unimodal polypropylene (PP) homopolymer may be produced in a multi-stage process using at each stage process conditions which result in similar polymer properties.

The term "polypropylene (PP) homopolymer" used in the present invention relates to a polypropylene that consists substantially, i.e. of more than 98.0 wt.-% of, preferably of more than 99.0 wt.-%, even more preferably of more than 99.7 wt.-%, still more preferably of at least 99.8 wt.-%, of propylene units. In a preferred embodiment, only propylene units in the polypropylene (PP) homopolymer are detectable.

In one embodiment, the propylene homopolymer, if present each of the polypropylene (PP) homopolymers in the mixture of at least two polypropylene (PP) homopolymers, has a comonomer content of ≤2.0 wt.-%, based on the total weight of the polypropylene (PP) homopolymer. Preferably, the polypropylene (PP) homopolymer, if present each of the polypropylene (PP) homopolymers in the mixture of at least two polypropylene (PP) homopolymers, has a comonomer content or less than 1.0 wt.-%, more preferably of less than 0.3 wt.-% and most preferably of less than 0.2 wt.-%, based on the total weight of the polypropylene (PP) homopolymer. In a preferred embodiment, no comonomer units are detectable for the polypropylene (PP) homopolymer, if present each of the polyppropylene homopolymers in the mixture of at least two polypropylene (PP) homopolymers.

Additionally or alternatively, the polypropylene (PP) homopolymer has a xylene cold soluble (XCS) content of equal or below 2.0 wt.-%, based on the total weight of the propylene homopolymer. For example, the polypropylene (PP) homopolymer has a xylene cold soluble (XCS) content of in the range from 0.1 to 1.5 wt.-%, preferably in the range from 0.2 to 1.2 wt.-%, based on the total weight of the polypropylene (PP) homopolymer.

It is a requirement of the present invention that the propylene (PP) homopolymer has a melt flow rate $MFR_2$ (230° C., 2.16 kg) measured according to ISO 1133 in the range from 1 to 200 g/10 min.

However, it is appreciated that the stiffness can be improved if the polypropylene (PP) homopolymer has a relatively low melt flow rate. Thus, it is preferred that the polypropylene (PP) homopolymer has a melt flow rate $MFR_2$ (230° C., 2.16 kg) measured according to ISO 1133 in the range from 2 to 100 g/10 min and more preferably in the range from 2.2 to 50 g/10 min.

It is a further requirement of the present invention that the polypropylene (PP) homopolymer has a relatively high melting temperature $T_m$. More precisely, it is required that the polypropylene (PP) homopolymer has a melting temperature $T_m$ measured by differential scanning calorimetry (DSC) of ≥153° C. For example, the polypropylene (PP) homopolymer has a melting temperature $T_m$ measured by differential scanning calorimetry (DSC) in the range from 153 to 165° C., preferably in the range from 153 to 163° C.

The relatively high melting temperature $T_m$ indicates that the polypropylene (PP) homopolymer has a rather low content of regiodefects. It is preferred that the polypropylene (PP) homopolymer has a content of <2,1> erythro regiodefects as determined from $^{13}$C-NMR spectroscopy in the range from 0.10 to 1.00 mol.-%. More preferably, the polypropylene (PP) homopolymer has 2,1 erythro regiodefects in the range from 0.15 to 0.85 mol.-% and most preferably in the range from 0.20 to 0.80 mol.-%, determined by $^{13}$C-NMR spectroscopy.

Additionally or alternatively, the polypropylene (PP) homopolymer has an isotactic triad fraction (mm) determined from $^{13}$C-NMR spectroscopy of at least 98.0%. For example, the polypropylene (PP) homopolymer has an isotactic triad fraction (mm) determined from $^{13}$C-NMR spectroscopy of at least 98.5%, more preferably of at least 99.0%.

It is preferred that the polypropylene (PP) homopolymer has a weight average molecular weight (Mw) in the range from 80 to 500 kg/mol, preferably in the range from 100 to 400 kg/mol, more preferably in the range from 120 to 350 k/mol, and/or a number average molecular weight (Mn) of 20 to 200 kg/mol, more preferably 50 to 150 kg/mol, determined by GPC according to ISO 16014.

It is preferred that the polypropylene (PP) homopolymer has a molecular weight distribution Mw/Mn measured according to ISO 16014 in the range from 1.5 to 4.5, preferably in the range from 2.0 to 4.0, and more preferably in the range from 2.5 to 4.0.

Thus, in one embodiment the polypropylene (PP) homopolymer has
a) a xylene cold soluble fraction (XCS) determined at 23° C. according ISO 16152 of equal or below 2.0 wt.-%, preferably in the range from 0.1 to 1.5 wt.-%, preferably in the range from 0.2 to 1.2 wt.-%, and/or
b) a weight average molecular weight (Mw) measured according to ISO 16014 in the range from 80 to 500 kg/mol, preferably in the range from 100 to 400 kg/mol, more preferably in the range from 120 to 350 k/mol, and/or
c) an isotactic triad fraction (mm) determined from $^{13}$C-NMR spectroscopy of at least 98.0%, preferably of at least 98.5%, more preferably of at least 99.0%, and/or
d) a content of <2,1> erythro regiodefects as determined from $^{13}$C-NMR spectroscopy in the range from 0.10 to 1.00 mol.-%, preferably in the range from 0.15 to 0.85 mol.-%, more preferably in the range from 0.20 to 0.80 mol.-%.

For example, the polypropylene (PP) homopolymer has
a) a xylene cold soluble fraction (XCS) determined at 23° C. according ISO 16152 of equal or below 2.0 wt.-%, preferably in the range from 0.1 to 1.5 wt.-%, preferably in the range from 0.2 to 1.2 wt.-%, or
b) a weight average molecular weight (Mw) measured according to ISO 16014 in the range from 80 to 500 kg/mol, preferably in the range from 100 to 400 kg/mol, more preferably in the range from 120 to 350 k/mol, or
c) an isotactic triad fraction (mm) determined from $^{13}$C-NMR spectroscopy of at least 98.0%, preferably of at least 98.5%, more preferably of at least 99.0%, or d) a content of <2,1> erythro regiodefects as determined from $^{13}$C-NMR spectroscopy in the range from 0.10 to 1.00 mol.-%, preferably in the range from 0.15 to 0.85 mol.-%, more preferably in the range from 0.20 to 0.80 mol.-%.

Alternatively, the polypropylene (PP) homopolymer has a) a xylene cold soluble fraction (XCS) determined at 23° C. according ISO 16152 of equal or below 2.0 wt.-%, more preferably in the range from 0.1 to 1.5 wt.-%, preferably in the range from 0.2 to 1.2 wt.-%, and b) a weight average molecular weight (Mw) measured according to ISO 16014 in the range from 80 to 500 kg/mol, preferably in the range from 100 to 400 kg/mol, more preferably in the range from 120 to 350 k/mol, and c) an isotactic triad fraction (mm) determined from $^{13}$C-NMR spectroscopy of at least 98.0%, preferably of at least 98.5%, more preferably of at least 99.0%, and d) a content of <2,1> erythro regiodefects as determined from $^{13}$C-NMR spectroscopy in the range from 0.10 to 1.00 mol.-%, preferably in the range from 0.15 to 0.85 mol.-%, more preferably in the range from 0.20 to 0.80 mol.-%.

In one embodiment, the polypropylene (PP) homopolymer has a heat deflection temperature HDT B measured in accordance with ISO 75 at a load of 0.46 MPa of at least 90° C., more preferably in the range from 90 to 100° C., such as in the range from 90 to 98° C. Additionally or alternatively, the polypropylene (PP) homopolymer has a heat deflection temperature HDT A measured in accordance with ISO 75 at a load of 1.8 MPa of at least 77° C., more preferably of at least 78° C., such as in the range from 78 to 86° C.

In one embodiment, it is preferred that the polypropylene (PP) homopolymer has a) a melt flow rate $MFR_2$ (230° C.) measured according to ISO 1133 in the range of 2 to 100 g/10 min, preferably from 2.2 to 50 g/10 min, and/or b) a melting temperature ($T_m$) measured by differential scanning calorimetry (DSC) in the range from 153 to 165° C., preferably in the range from 153 to 163° C., and/or c) a heat deflection temperature HDT B measured in accordance with ISO 75 at a load of 0.46 MPa of at least 90° C., more preferably in the range from 90 to 100° C., such as in the range from 90 to 98° C.

For example, the polypropylene (PP) homopolymer has a) a melt flow rate $MFR_2$ (230° C.) measured according to ISO 1133 in the range of 2 to 100 g/10 min, preferably from 2.2 to 50 g/10 min, and b) a melting temperature ($T_m$) measured by differential scanning calorimetry (DSC) in the range from 153 to 165° C., preferably in the range from 153 to 163° C., and c) a heat deflection temperature HDT B measured in accordance with ISO 75 at a load of 0.46 MPa of at least 90° C., more preferably in the range from 90 to 100° C., such as in the range from 90 to 98° C.

Additionally or alternatively, the polypropylene (PP) homopolymer has a flexural modulus of at least 1300 MPa, preferably in the range from 1300 to 2200 MPa, more preferably in the range from 1350 to 2000 MPa and most preferably in the range from 1380 to 1900 MPa.

The polypropylene (PP) homopolymer may be produced by a single- or multistage process polymerization of propylene such as bulk polymerization, gas phase polymerization, slurry polymerization, solution polymerization or combinations thereof. A polypropylene (PP) homopolymer can be made either in loop reactors or in a combination of loop and gas phase reactor. Those processes are well known to one skilled in the art.

In order to overcome the drawbacks of the prior art, it is appreciated that the polypropylene (PP) homopolymer must be polymerized in the presence of a single-site catalyst.

A suitable catalyst for the polymerization of the polypropylene (PP) homopolymer is any stereospecific single-site catalyst for propylene polymerization, which is capable of polymerizing propylene at a temperature of 40 to 110° C. and at a pressure from 10 to 100 bar.

Catalyst

The polypropylene (PP) homopolymer of the present invention is polymerized in the presence of a single-site catalyst.

The catalyst used in the invention can be used in non-supported form or in solid form. The catalyst of the invention should however be used as a heterogeneous (solid) catalyst.

Generally the quantity of catalyst will depend upon the nature of the catalyst, the reactor types and conditions and the properties desired for the polypropylene (PP) homopolymer.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) a complex and (ii) a cocatalyst; dispersed in a solvent so as to form dispersed droplets; and (b) solid particles are formed by solidifying said dispersed droplets.

The catalyst is ideally manufactured by obtaining (i) a complex e.g. of formula (I) and (ii) a cocatalyst; forming a liquid/liquid emulsion system, which comprises a solution of catalyst components (i) and (ii) dispersed in a solvent, and solidifying said dispersed droplets to form solid particles.

By free from an external carrier is meant that the catalyst does not contain an external support, such as an inorganic support, for example, silica or alumina, or an organic polymeric support material.

In the definitions which follow, the term $C_{1-20}$ hydrocarbyl group therefore includes $C_{1-20}$alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$alkylaryl groups or $C_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$ hydrocarbyl groups are $C_{1-20}$ alkyl, $C_{4-20}$ cycloalkyl, $C_{5-20}$cycloalkylalkyl groups, $C_{7-20}$ alkylaryl groups, $C_{7-20}$ arylalkyl groups or $C_{6-20}$ aryl groups, especially $C_{1-10}$alkyl groups, $C_{6-10}$ aryl groups, or $C_{7-12}$ arylalkyl groups, e.g. $C_{1-8}$alkyl groups. Most especially preferred hydrocarbyl groups are methyl, ethyl, propyl, isopropyl, tertbutyl, isobutyl, $C_{5-6}$ cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It is appreciated that in the complexes, the metal ion M is coordinated by ligands X so as to satisfy the valency of the metal ion and to fill its available coordination sites. The nature of these 6-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

The single site catalyst is preferably a metallocene. The preparation of the metallocene catalyst can be carried out according to or analogously to the methods known from the literature and is within the skills of an art skilled person. Said metallocenes typically bear at least one organic ligand, generally 1, 2 or 3, e.g. 1 or 2, which is $\eta^5$-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula I:

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$^2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

T is a bridge of 1-3 atoms, e.g. a bridge of 1-2 C-atoms or 1-2 heteroatoms, wherein the heteroatom(s) can be e.g. Si, Ge and/or O atom(s), whereby each of the bridge atoms may bear independently substituents, such as $C_1$-$C_{20}$-alkyl, tri ($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1_2$—, wherein each R$^1$ is independently $C_1$-$C_{20}$-alkyl, $C_6$-$C_{20}$-aryl or tri($C_1$-$C_{20}$-alkyl)silyl-residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"$_3$, —SR", —PR"$_3$, —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$^2$, the two substituents R" can form a ring, e.g. five- or six-membered ring, together with the nitrogen atom wherein they are attached to.

Each of the above mentioned ring moieties alone or as a part of a moiety as the substituent for Cp, A, R" or R<1> can further be substituted e.g. with $C_1$-$C_{20}$-alkyl which may contain Si and/or O atoms;

n is 1 or 2, e.g. 1,
m is 1, 2 or 3, e.g. 1 or 2,
q is 1, 2 or 3, e.g. 2 or 3, wherein m+q is equal to the valency of M.

Whilst therefore the invention is generally applicable to a stereospecific single site catalyst, the polypropylene (PP) homopolymer is preferably prepared in the presence of a metallocene of formula (II). It is understood that the complex used in the invention consists of its racemic mixture.

Metallocenes of formula (II) therefore include:

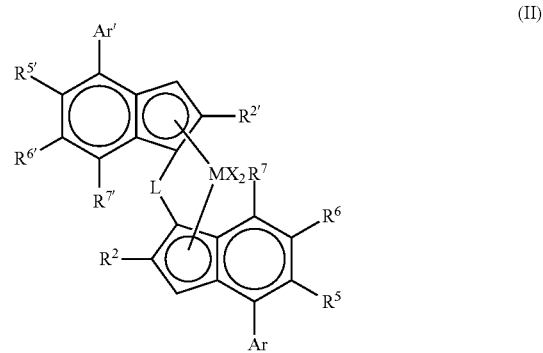

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$hydrocarbyl radical optionally containing one or more heteroatoms from groups 14-16;
$R^5$ and $R^{5'}$ are each independently hydrogen, $C_{1-20}$ hydrocarbyl group optionally containing one or more heteroatoms from groups 14-16 and optionally substituted by one or more halo atoms;
$R^6$ and $R^{6'}$ are each independently hydrogen or a $C_{1-20}$ hydrocarbyl group optionally containing one or more heteroatoms from groups 1416; or
$R^5$ and $R^6$ taken together can form a 5 or 6 membered saturated or unsaturated carbon ring fused to the 6-membered ring of the indenyl group; or
$R^{5'}$ and $R^{6'}$ taken together can form a 5 or 6 membered saturated or unsaturated carbon ring fused to the 6-membered ring of the indenyl group;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;

each $R^1$ is a $C_{1-20}$ hydrocarbyl group or two R<1> groups on adjacent carbon atoms taken together can form a fused 5 or 6 membered non aromatic ring with the Ar group, said ring being itself optionally substituted with one or more groups $R^4$; and each $R^4$ is a $C_{1-20}$ hydrocarbyl group.

More preferably, the complex is of formula (III)

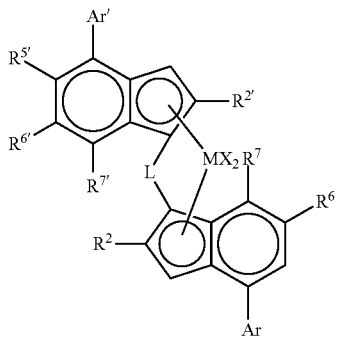

(III)

wherein

M is zirconium or hafnium;

each X is a sigma ligand;

L is a divalent bridge selected from —$R'_2C$—, —$R'_2C$—$CR'_2$—, —R'2Si—, —R'2Si—SiR'$_2$—, —$R'_2Ge$—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$hydrocarbyl radical optionally containing one or more heteroatoms from groups 14-16;

$R^{5'}$ is a $C_{1-20}$ hydrocarbyl group optionally containing one or more heteroatoms from groups 14-16 and optionally substituted by one or more halo atoms;

$R^6$ and $R^{6'}$ are each independently hydrogen or a $C_1$-$C_{20}$hydrocarbyl group optionally containing one or more heteroatoms from groups 14-16;

$R^7$ and $R^{7'}$ are each independently hydrogen or $C_1$-$C_{20}$hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_1$-$C_{20}$hydrocarbyl group or two $R^1$ groups on adjacent carbon atoms taken together can form a fused 5 or 6 membered non aromatic ring with the Ar group, said ring being itself optionally substituted with one or more groups $R^4$; and each $R^1$ is a $C_1$-$C_{20}$hydrocarbyl group.

The complexes are symmetrical or asymmetrical, preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the FIGURE below.

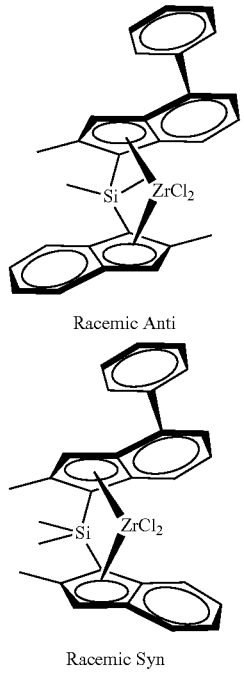

Racemic Anti

Racemic Syn

Formula (III) is intended to cover both syn and anti configurations, preferably anti. It is required in addition in compounds of formula (III), that the group $R^{5'}$ is not hydrogen where the 5-position in the other ligand carries a hydrogen.

In fact, the metallocenes of the invention are ideally $C_1$-symmetric but they maintain a pseudo-$C_2$-symmetry since they maintain $C_2$-symmetry in close proximity of the metal center, although not at the ligand periphery. As will be seen, the use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocenes are employed as the rac anti isomer. Ideally therefore at least 95% mol, such as at least 98% mol, especially at least 99% mol of the metallocene E in the racemic anti isomeric form.

In the catalysts of the invention: M is preferably Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$ alkyl, $C_{2-20}$ alkenyl, $C_{2-20}$ alkynyl, $C_{6-20}$ aryl, $C_{7-20}$ alkylaryl or $C_{7-20}$ arylalkyl radical; optionally containing heteroatoms belonging to groups 1416. R is preferably a $C_{1-6}$alkyl, phenyl or benzyl group.

Most preferably each X is independently a hydrogen atom, a halogen atom, $C_{1-6}$ alkoxy group or an R group, e.g. preferably a $C_{1-6}$ alkyl, phenyl or benzyl group. Most preferably, X is chlorine or a methyl radical. Preferably, both X groups are the same.

L is preferably an alkylene linker or a bridge comprising a heteroatom, such as silicon or germanium, e.g. —SiR$^8_2$—, wherein each R$^8$ is independently C$_{1-20}$ alkyl, C$_{3-10}$ cycloalkyl, C$_{6-20}$aryl or tri(C$_{1-20}$ alkyl)silyl, such as trimethylsilyl. More preferably R$^8$ is C$_{1-6}$ alkyl, especially methyl or C$_{3-7}$cycloalkyl, such as cyclohexyl. Most preferably, L is a dimethylsilyl or a methylcyclohexylsilyl bridge (i.e. Me-Si-cyclohexyl). It may also be an ethylene bridge.

R$^2$ and R$^{2'}$ can be different but they are preferably the same. R$^2$ and R$^{2'}$ are preferably a C$_{1-10}$hydrocarbyl group such as C$_{1-6}$ hydrocarbyl group. More preferably, it is a linear or branched C$_{1-10}$alkyl group. More preferably, it is a linear or branched C$_{1-6}$ alkyl group, especially linear C$_{1-6}$ alkyl group such as methyl or ethyl.

The R$^2$ and R$^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the R$^2$ and R$^{2'}$ groups are free from heteroatoms. Most especially R$^2$ and R$^{2'}$ methyl, especially both methyl.

The two Ar groups Ar and Ar' can be the same or different. It is preferred however if the Ar groups are different. The Ar' group may be unsubstituted. The Ar' is preferably a phenyl based group optionally substituted by groups R$^1$, especially an unsubstituted phenyl group.

The Ar group is preferably a C$_{6-20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups R$^1$, more preferably by one or two R$^1$ groups, especially in position 4 of the aryl ring bound to the indenyl ligand or in the 3,5-positions.

In one embodiment both Ar and Ar' are unsubstituted. In another embodiment Ar' is unsubstituted and Ar is substituted by one or two groups R$^1$.

R$^1$ is preferably a C$_{1-20}$ hydrocarbyl group, such as a C$_{1-20}$ alkyl group. R$^1$ groups can be the same or different, preferably the same. More preferably, R$^1$ is a C$_{2-10}$alkyl group such as C$_{3-8}$alkyl group. Highly preferred groups are tert butyl or isopropyl groups. It is preferred if the group R$^1$ is bulky, i.e. is branched. Branching might be alpha or beta to the ring. Branched C$_{3-8}$ alkyl groups are also favoured therefore.

In a further embodiment, two R$^1$ groups on adjacent carbon atoms taken together can form a fused 5 or 6 membered non aromatic ring with the Ar group, said ring being itself optionally substituted with one or more groups R$^4$. Such a ring might form a tetrahydroindenyl group with the Ar ring or a tetrahydronaphthyl group.

If an R$^4$ group is present, there is preferably only 1 such group. It is preferably a C$_{1-10}$ alkyl group.

It is preferred if there is one or two R$^1$ groups present on the Ar group. Where there is one R$^1$ group present, the group is preferably para to the indenyl ring (4-position). Where two R$^1$ groups are present these are preferably at the 3 and 5 positions.

R$^5$ is preferably H.

R$^{5'}$ is preferably a C$_{1-20}$ hydrocarbyl group containing one or more heteroatoms from groups 14-16 and optionally substituted by one or more halo atoms or R$^{5'}$ is a C$_{1-10}$alkyl group, such as methyl but most preferably it is a group Z'R$^{3'}$.

R$^6$ and R$^{6'}$ may be the same or different. In one preferred embodiment one of R$^6$ and R$^{6'}$ is hydrogen, especially R$^6$. It is preferred if R$^6$ and R$^{6'}$ are not both hydrogen. If not hydrogen, it is preferred if each R$^6$ and R$^{6'}$ is preferably a C$_{1-20}$ hydrocarbyl group, such as a C$_{1-20}$ alkyl group or C$_{6-10}$aryl group. More preferably, R$^6$ and R$^{6'}$ are a C$_{2-10}$alkyl group such as C$_{3-8}$alkyl group. Highly preferred groups are tert-butyl groups. It is preferred if R$^6$ and R$^{6'}$ are bulky, i.e. are branched. Branching might be alpha or beta to the ring. Branched C$_{3-8}$alkyl groups are also favoured therefore.

In a further embodiment, R$^5$ and R$^6$ taken together form a 5 membered carbon ring with the atoms to which they are attached.

In a further embodiment, R$^{5'}$ and R$^{6'}$ taken together form a 5 membered carbon ring with the atoms to which they are attached.

The R$^7$ and R$^{7'}$ groups can be the same or different. Each R$^7$ and R$^{7'}$ group is preferably hydrogen, a C$_{1-6}$ alkyl group or is a group ZR$^3$. It is preferred if R$^{7'}$ is hydrogen. It is preferred if R$^7$ is hydrogen, C$_{1-6}$ alkyl or ZR$^3$. The combination of both R$^7$ and R$^{7'}$ being hydrogen is most preferred. It is also preferred if ZR$^3$ represents OC$_{1-6}$ alkyl, such as methoxy. It is also preferred is R$^7$ represents C$_{1-6}$alkyl such as methyl.

Z and Z' are O or S, preferably 0.

R$^3$ is preferably a C$_{1-10}$hydrocarbyl group, especially a C$_{1-10}$alkyl group, or aryl group optionally substituted by one or more halo groups. Most especially R$^3$ is a C$_{1-6}$ alkyl group, such as a linear C$_{1-6}$ alkyl group, e.g. methyl or ethyl R$^{3'}$ is preferably a C$_{1-10}$hydrocarbyl group, especially a C$_{1-10}$alkyl group, or aryl group optionally substituted by one or more halo groups. Most especially R$^{3'}$ is a C$_{1-6}$ alkyl group, such as a linear C$_{1-6}$alkyl group, e.g. methyl or ethyl or it is a phenyl based radical optionally substituted with one or more halo groups such as Ph or C$_6$F$_5$.

Thus, preferred complexes of the invention are of formula (IV') or (IV)

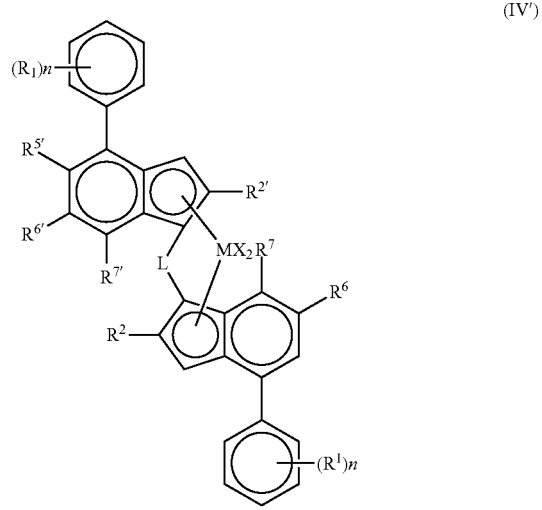

(IV')

-continued

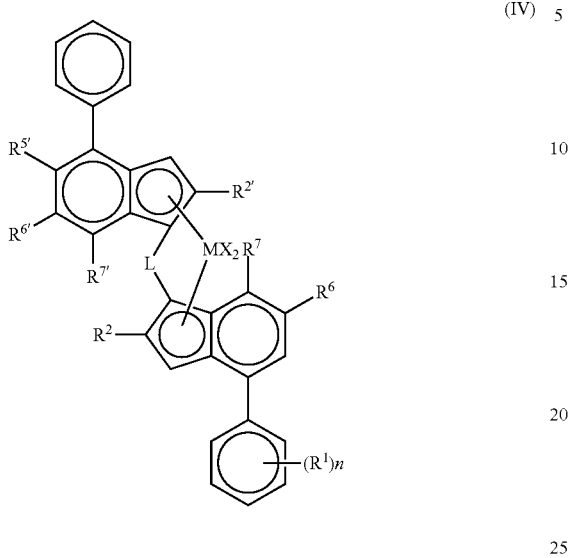

(IV)

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$cycloalkyl, tri($C_{1-20}$-alkyl)silyl, $C_{6-20}$ aryl, $C_{7-20}$ arylalkyl or $C_{7-20}$ alkylaryl;

each $R^2$ or $R^{2'}$ is a $C_{1-10}$alkyl group;

$R^{5'}$ is a $C_{1-10}$alkyl group or Z'R$^{3'}$ group;

$R^6$ is hydrogen or a $C_{1-10}$alkyl group;

$R^{6'}$ is a $C_{1-10}$alkyl group or $C_{6-10}$ aryl group;

$R^7$ is hydrogen, a $C_{1-6}$ alkyl group or ZR$^3$ group;

$R^{7'}$ is hydrogen or a $C_{1-10}$alkyl group;

Z and Z' are independently O or S;

$R^{3'}$ is a $C_{1-10}$alkyl group, or a $C_{6-10}$ aryl group optionally substituted by one or more halo groups;

$R^3$ is a $C_{1-10}$alkyl group;

each n is independently 0 to 4, e.g. 0, 1 or 2;

and each $R^1$ is independently a $C_{1-20}$ hydrocarbyl group, e.g. $C_{1-10}$alkyl group.

In one embodiment, the metallocene is a complex of formula (V') or (V):

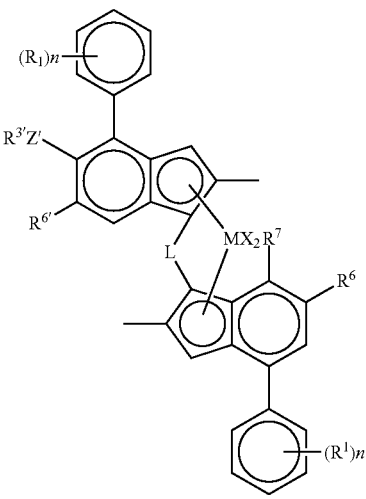

(V')

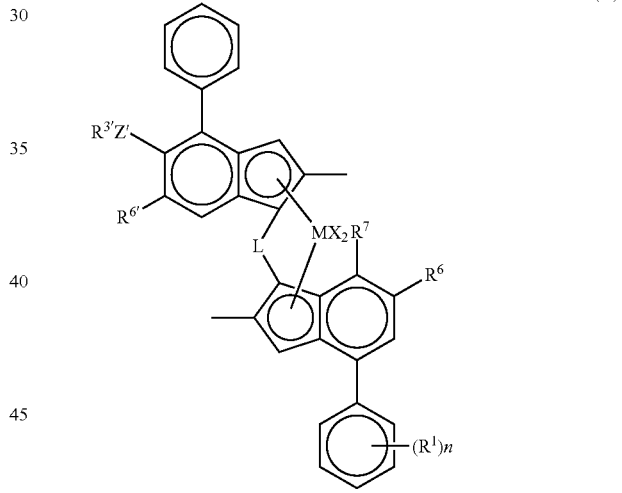

(V)

wherein M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'2Si— wherein each R' is independently a hydrogen atom, $C_{1-20}$ alkyl or $C_{3-10}$ cycloalkyl;

$R^6$ is hydrogen or a $C_{1-10}$alkyl group;

$R^{6'}$ is a $C_{1-10}$alkyl group or $C_{6-10}$ aryl group;

$R^7$ is hydrogen, $C_{1-6}$ alkyl or O$C_{1-6}$ alkyl;

Z' is O or S;

$R^{3'}$ is a $C_{1-10}$alkyl group, or $C_{6-10}$ aryl group optionally substituted by one or more halo groups;

n is independently 0 to 4, e.g. 0, 1 or 2; and each $R^1$ is independently a $C_{1-10}$alkyl group.

In one embodiment, the metallocene is a complex of formula (VI') or (VI):

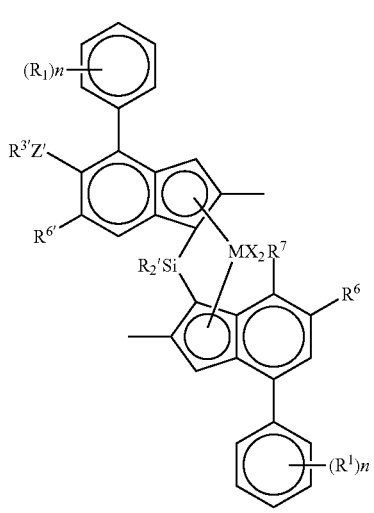

(VI')

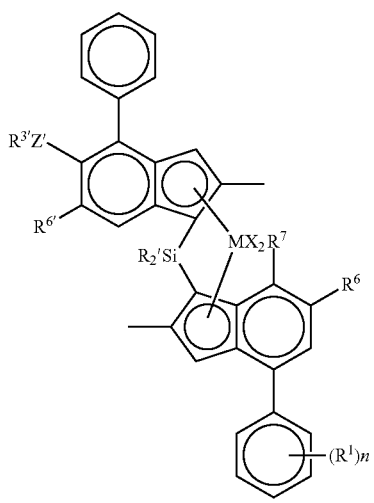

(VI)

M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
each R' is independently a hydrogen atom, $C_{1-20}$ alkyl or $C_{3-7}$ cycloalkyl;
$R^6$ is hydrogen or a $C_{1-10}$alkyl group;
$R^{6'}$ is a $C_{1-10}$alkyl group or $C_{6-10}$ aryl group;
$R^7$ is hydrogen, $C_{1-6}$ alkyl or $OC_{1-6}$ alkyl;
Z' is O or S;
$R^{3'}$ is a $C_{1-10}$alkyl group, or $C_{6-10}$ aryl group optionally substituted by one or more halo groups;
n is independently 0, 1 to 2; and
each $R^1$ is independently a $C_{3-8}$ alkyl group.

Most especially, the metallocene is of formula (VII') or (VII):

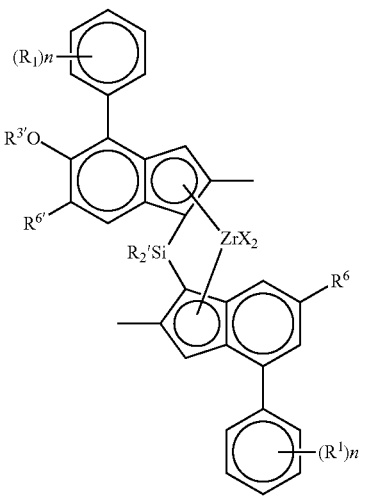

(VII')

(VII)

wherein each X is a sigma ligand, preferably each X is independently a hydrogen atom, a halogen atom, $C_{1-6}$ alkoxy group, $C_{1-6}$ alkyl, phenyl or benzyl group;
R' is independently a $C_{1-6}$ alkyl or $C_{3-10}$ cycloalkyl;
$R^1$ is independently $C_{3-8}$alkyl;
$R^6$ is hydrogen or a $C_{3-8}$ alkyl group;
$R^{6'}$ is a $C_{3-8}$ alkyl group or $C_{6-10}$ aryl group;
$R^{3'}$ is a $C_{1-6}$alkyl group, or $C_{6-10}$aryl group optionally substituted by one or more halo groups; and
n is independently 0, 1 or 2.

Particular compounds of the invention include:

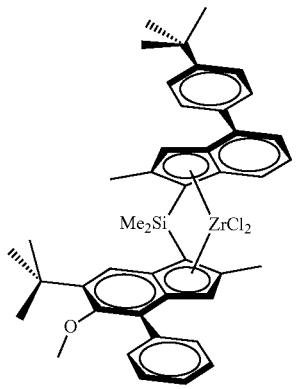

rac-anti-Me$_2$Si(2-Me-4-(p-tBuPh)-Ind)(2-Me-4-Ph-5-OMe-6-tBu-Ind)ZrCl$_2$

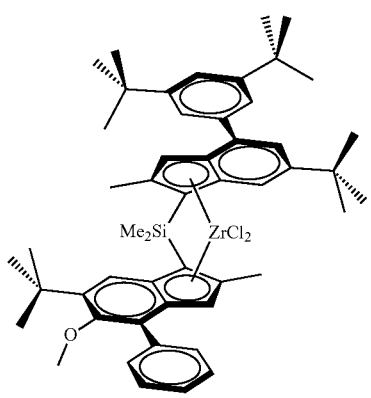

rac-anti-Me$_2$Si(2-Me-4-(3,5-di-tBuPh)-6-tBu-Ind)(2-Me-4-Ph-5-OMe-6-tBu-Ind)ZrCl$_2$

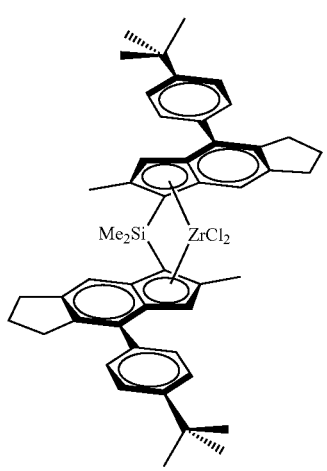

rac-dimethylsilanediylbis [2-methyl-4-(4-tert-butylphenyl)-1,5,6,7-tetrahydro-s-indacen-1-yl] zirconium dichloride

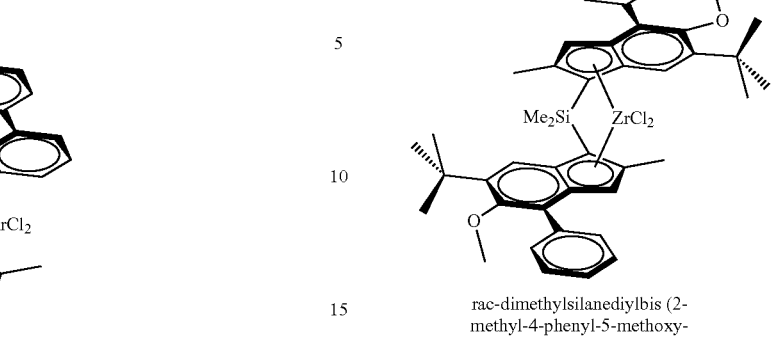

rac-dimethylsilanediylbis (2-methyl-4-phenyl-5-methoxy-6-tert-butyLinden-1-yl) zirconium dichloride

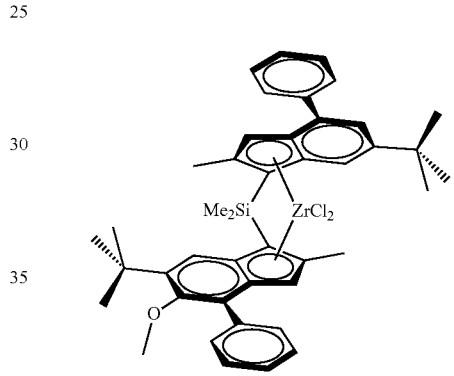

rac-anti-Me$_2$Si(2-Me-4-Ph-6-tBu-Ind)(2-Me-4-Ph-5-OMe-6-tBu-Ind)ZrCl$_2$

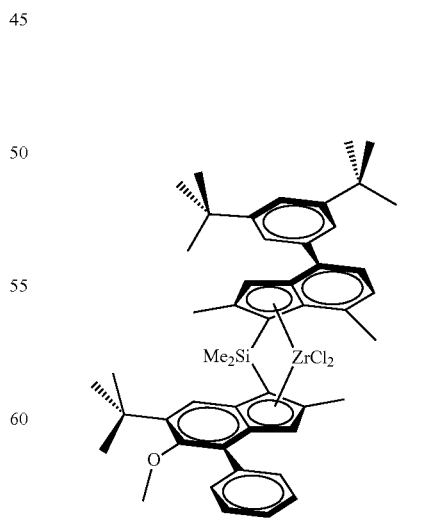

rac-anti-Me$_2$Si(2-Me-4-(3,5-di-tBuPh)-7-Me-Ind)(2-Me-4-Ph-5-OMe-6-tBu-Ind)ZrCl$_2$

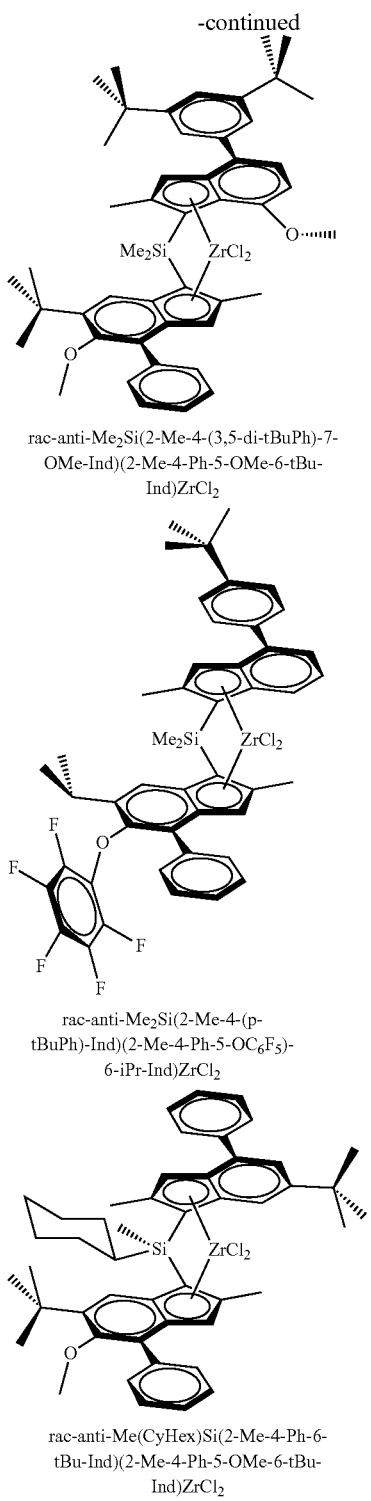

rac-anti-Me₂Si(2-Me-4-(3,5-di-tBuPh)-7-OMe-Ind)(2-Me-4-Ph-5-OMe-6-tBu-Ind)ZrCl₂ rac-anti-Me₂Si(2-Me-4-(p-tBuPh)-Ind)(2-Me-4-Ph-5-OC₆F₅)-6-iPr-Ind)ZrCl₂ rac-anti-Me(CyHex)Si(2-Me-4-Ph-6-tBu-Ind)(2-Me-4-Ph-5-OMe-6-tBu-Ind)ZrCl₂

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

These catalysts can be made following the principles in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts such as $B(C_6F_5)_3$, $C_6H_5N(CH_3)_2H:B(C_6F_5)_4$, $(C_6H_5)_3C:B(C_6F_5)_4$ or $Ni(CN)_4$ $[B(C_6F_5)_3]_4{}^{2-}$ are also known. Suitable cocatalysts are described in WO2013/007650 which is herewith incorporated by reference.

Suitable amounts of cocatalyst will be well known to the person skilled in the art.

Catalyst Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 μm, more preferably 20 to 80 μm. The use of these supports is routine in the art.

In an alternative embodiment no external carrier is used but the catalyst is still presented in solid particulate form. Thus no external support material such as inert organic or inorganic carrier, such as for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

All or part of the preparation steps can be done in a continuous manner Reference is made to WO2006/069733 describing principles of such a continuous or semicontinuous preparation methods of the solid catalyst types, prepared via emulsion/solidification method.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation. Such a catalyst prepolmyerisation step is also denoted "off-line prepolymerisation step" or "off-line prepolymerisation".

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264 which are all herewith incorporated by reference in their entirety. Preferable embodiments of this aspect of the invention are described herein.

As monomers in the catalyst prepolymerisation step preferably alpha-olefins are used. Preferable $C_2$-$C_{10}$ alpha olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimizing leaching of catalyst components and thus local overheating.

After prepolymerisation, the catalyst can be isolated and stored.

The Mineral Filler

In addition to the polypropylene (PP) homopolymer, the polypropylene (PP) composition according to the present invention comprises a mineral filler in amounts from 5.0 to 50.0 wt.-%, based on the total weight of the polypropylene (PP) composition.

Preferably, the polypropylene (PP) composition comprises the mineral filler in amounts from 8.0 to 45.0 wt.-%, like in the range of 10.0 to 40.0 wt.-%, based on the total weight of the polypropylene (PP) composition.

Preferably the mineral filler (F) is an anisotropic mineral filler.

It is preferred that the mineral filler has a particle size $d_{50}$ in the range from 0.1 to 10 µm, preferably in the range from 0.2 to 6.0 µm, more preferably in the range from 0.3 to 4.0 µm.

The anisotropic mineral filler preferably has a platelet form, with two dimensions being significantly higher than the third dimension. In the biggest dimension, the mineral filler platelets preferably have a particle size $d_{50}$ in the range from 0.1 to 10 µm, preferably in the range from 0.2 to 6.0 µm, more preferably in the range from 0.3 to 4.0 µm.

The mineral filler preferably has a specific surface area (BET) in the range of 5 to 25 $m^2/g$, more preferably in the range of 8 to 20 $m^2/g$, still more preferably in the range of 12 to 16 $m^2/g$.

The mineral filler is preferably selected from the group comprising talc, wollastonite, mica, montmorillonite, magnesium sulfate, magnesium hydroxide, halloysite and mixtures thereof.

Preferably, the mineral filler is lamellar, such as mica or talc. More preferably, the filler is finely divided. The mineral filler preferably has a top cut (95% of particles below that size, according to ISO 787-7) of 0.8 to 50 µm, preferably from 1.0 to 25 µm and most preferably from 1.2 to 20 µm.

In the present invention all layer materials may be used as long as they have the ability to disperse in the polypropylene (PP) composition. The filler may preferably be either a clay-based compound or a submicron filler such as talc or mica, which usually have been treated, for instance by grinding, to obtain particles of small, i.e. submicron, dimensions, in situ as stated above.

The most preferred mineral filler is talc. Preferably talc having a particle size $d_{50}$ in the range from 0.1 to 10 μm, preferably in the range from 0.2 to 6.0 μm, more preferably in the range from 0.3 to 4.0 μm is used as filler. Most preferably talc is used as the sole mineral filler. Still more preferably the talc used has a top-cut particle size (95% of particles below that size, according to ISO 787-7) of 0.8 to 50 μm, preferably from 1.0 to 25 μm and most preferably from 1.2 to 20 μm.

In addition, the present invention also relates to a process for the preparation of the polypropylene (PP) composition, comprising the steps of adding
  a) 50.0 to 95.0 wt.-%, based on the total weight of the polypropylene (PP) composition, of a polypropylene (PP) homopolymer being polymerized in the presence of a single-site catalyst and having
    i) a melt flow rate $MFR_2$ (230° C.) measured according to ISO 1133 in the range of 1 to 200 g/10 min, and
    ii) a melting temperature ($T_m$) measured by differential scanning calorimetry (DSC) of ≥153° C., and
  b) 5.0 to 50.0 wt.-%, based on the total weight of the polypropylene (PP) composition, of a mineral filler,
  c) optionally up to 2.0 wt.-%, based on the total weight of the polypropylene (PP) composition, of one or more additives, and
  d) optionally from 0.002 to 1.5 wt.-%, based on the total weight of the polypropylene (PP) composition, of a nucleating agent,
to an extruder and extruding the same obtaining said polypropylene (PP) composition.

With regard to the components provided in steps a), b), c) and d) and preferred embodiments thereof, it is referred to the definitions set out above when defining the present polypropylene (PP) composition and its single components.

In view of the above, it is appreciated that the polypropylene (PP) composition is preferably obtained by the process set out herein.

The polypropylene (PP) composition according to the invention may be pelletized and compounded using any of the variety of compounding and blending methods well known and commonly used in the resin compounding art.

The composition of the present polyproypylene composition can be used for the production of articles such as molded articles, preferably injection molded articles as well as foamed articles. Even more preferred is the use for the production of automotive articles, especially of automotive interior articles and exterior articles, like instrumental carriers, front end module, shrouds, structural carriers, bumpers, side trims, step assists, body panels, spoilers, dashboards, interior trims and the like. Preferably, the article is an automotive interior article.

The present invention thus refers in another aspect to an article, preferably an automotive interior article, comprising the polypropylene (PP) composition as defined herein.

As already described above, the polypropylene (PP) composition has an advantageous relation between melting temperature ($T_m$) and heat deflection temperature (HDT). Thus, the present invention refers in a further aspect to the use of the polypropylene (PP) composition, as defined herein, for improving the thermo-mechanical properties. It is appreciated that the improvement is achieved if the polypropylene (PP) composition has a ratio of melting temperature ($T_m$) measured by differential scanning calorimetry (DSC) to heat deflection temperature (HDT) measured according to ISO 75 A [Tm/HDT] of ≤2.0. For example, the improvement is achieved if the polypropylene (PP) composition has a ratio of melting temperature ($T_m$) measured by differential scanning calorimetry (DSC) to heat deflection temperature (HDT) measured according to ISO 75 A [Tm/HDT] in the range from 1.5 to 2.0.

The present invention will now be described in further detail by the examples provided below.

EXAMPLES

1. Definitions/Measuring Methods

The following definitions of terms and determination methods apply for the above general description of the invention as well as to the below examples unless otherwise defined.

Melting temperature Tm was measured according to ISO 11357-3.

$MFR_2$ (230° C.) was measured according to ISO 1133 (230° C., 2.16 kg load).

$MFR_2$ (190° C.) was measured according to ISO 1133 (190° C., 2.16 kg load).

The xylene cold solubles (XCS, wt.-%) were determined at 25° C. according to ISO 16152; first edition; 2005-07-01.

Intrinsic viscosity is measured according to DIN ISO 1628/1, October 1999 (in Decalin at 135° C.).

Quantification of Microstructure by NMR Spectroscopy

Quantitative nuclear-magnetic resonance (NMR) spectroscopy was used to quantify the comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C$ {$^1H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Flexural Modulus was determined in 3-point-bending according to ISO 178 on injection molded specimens of 80×10×4 mm prepared in accordance with ISO 294-1:1996.

DSC analysis, melting temperature ($T_m$), crystallization temperature ($T_c$), heat of fusion ($H_m$) and heat of crystallization ($H_c$): measured with a TA Instrument Q2000 differential scanning calorimetry (DSC) on 5 to 7 mg samples. DSC is running according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_m$) are determined from the second heating step.

Heat Deflection Temperature A (HDT A) was determined according to ISO 75 A with a load of 1.8 MPa using 80×10×4 mm³ test bars injection molded in line with EN ISO 1873-2.

Heat deflection temperature B (HDT B) was determined according to ISO 75 B at 0.45 MPa using 80×10×4 mm³ test bars injection molded in line with EN ISO 1873-2.

Number average molecular weight ($M_n$) and weight average molecular weight ($M_w$) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Particle size $d_{50}$ and top cut $d_{95}$ were calculated from the particle size distribution [mass percent] as determined by gravitational liquid sedimentation according to ISO 13317-3 (Sedigraph).

2. Examples

All the chemicals and chemical reactions were handled under an inert gas atmosphere using Schlenk and glovebox techniques, with oven-dried glassware, syringes, needles or cannulas.

MAO was purchased from Albermarle and used as a 30 wt-% solution in toluene. Perfluoroalkylethyl acrylate ester mixture (CAS number 65605-70-1) was purchased from the Cytonix corporation, dried over activated molecular sieves (2 times) and degassed by argon bubbling prior to use.

Hexadecafluoro-1,3-dimethylcyclohexane (PFC) (CAS number 335-27-3) was obtained from commercial sources and dried over activated molecular sieves (2 times) and degassed by argon bubbling prior to use.

Triethylaluminum was purchased from Aldrich and used as a 1 M solution in n-hexane. Hydrogen is provided by Air Liquide and purified before use. Propylene is provided by Borealis and purified before use.

Complex:

As metallocene complex was used the racemic anti-dimethylsilanediyl[2-methyl-4-(4-tert-butylphenyl)-inden-1-yl][2-methyl-4-(4-tert-butylphenyl)-5-methoxy-6-tert-butyl-inden-1-yl]zirconium dichloride (MC1) according to the following formula

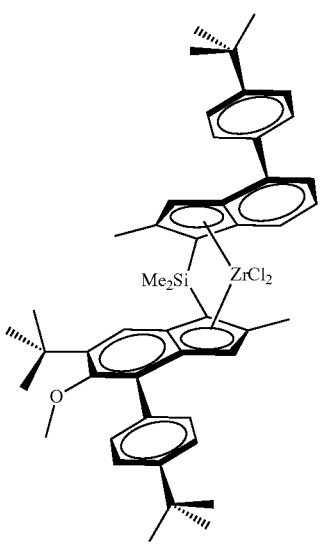

Synthesis of racemic anti-dimethylsilanediyl[2-methyl-4-(4-tert-butylphenyl)-inden-1-yl][2-methyl-4-(4-tert-butylphenyl)-5-methoxy-6-tert-butyl-inden-1-yl]zirconium dichloride can be found in WO2013/007650.

Catalyst Preparation:

Inside the glovebox, 54 μL of dry and degassed mixture of perfluoroalkylethyl acrylate ester (used as surfactant) were mixed with 2 mL of MAO in a septum bottle and left to react overnight. The following day, 44.50 mg of metallocene MC1 (0.051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at −10° C./600 rpm. Then the emulsion was transferred via a ⅔ teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 1.0 g of a red solid catalyst was obtained.

Pre-Activation Procedure:

The catalyst as prepared above (MC1-Cat) was pre-polymerised according to the following procedure Off-line pre-polymerisation experiments were done in a 125 mL pressure reactor equipped with gas-feeding lines and an overhead stirrer. Dry and degassed perfluoro-1,3-dimethyl-cyclohexane (PFC)(15 ml) and the desired amount of the catalyst MC1-Cat (604.6 mg) to be pre-polymerised were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for the polymerisation time (17.5 min) sufficient to provide the desired degree of polymerisation (DP). The reactor was then taken back inside the glove box before opening and the content was poured into a glass vessel. PFC was evaporated until a constant weight was obtained to yield 2.90 g of the pre-polymerised catalyst. The degree of polymerisation (DP) was determined gravimetrically and/or by analysis of the ash and/or aluminium content of the catalyst. Pre-polymerization degree is 3.8 g(PP)/g(cat). Prepolymerised MC1-Cat is marked as PMC1-Cat.

The catalyst used and its composition is listed in table 1:

TABLE 1 used catalyst

| Catalyst type | | |
|---|---|---|
| | DP | MC1 |
| | g/g | wt.-% |
| PMC1-Cat | 3.8 | 0.65 |

The homopolymers H-PP5, H-PP6 and H-PP7 were polymerized in a 20 L bench scale reactor at 75° C. in bulk slurry phase.

The following comparative examples CE1 to CE6 as well as inventive examples IE1 to IE4 were prepared by mixing the corresponding propylene homopolymer with talc, and, if present, with the nucleating agent and additives, as outlined in tables 2 and 3, and compounding the mixtures on a co-rotating twin-screw extruder TSE16TC with an L/D ratio of 30:1 and D of 16 mm.

TABLE 2

Overview of the composition for comparative examples CE1 to CE6

| | | CE1 | CE2 | CE3 | CE4 | CE5 | CE6 |
|---|---|---|---|---|---|---|---|
| H-PP1 | [wt.-%] | 74.55 | | | | | |
| H-PP2 | [wt.-%] | | 74.55 | | | | |
| H-PP3 | [wt.-%] | | | 74.55 | | | |
| H-PP4 | [wt.-%] | | | | 74.75 | 99.75 | |
| H-PP5 | [wt.-%] | | | | | | 99.75 |
| Talc | [wt.-%] | 25 | 25 | 25 | 25 | — | — |
| NA | [wt.-%] | 0.2 | 0.2 | 0.2 | — | — | — |
| Additives | [wt.-%] | 0.25 | 0.25 | 0.25 | 0.25 | 0.25 | 0.25 |

TABLE 3

Overview of the composition for inventive examples IE1 to IE4

|  |  | IE1 | IE2 | IE3 | IE4 |
|---|---|---|---|---|---|
| H-PP6 | [wt.-%] | 74.55 |  |  |  |
| H-PP7 | [wt.-%] |  | 74.55 |  |  |
| H-PP5 | [wt.-%] |  |  | 89.75 | 59.75 |
| Talc | [wt.-%] | 25 | 25 | 10 | 40 |
| NA | [wt.-%] | 0.2 | 0.2 | — | — |
| Additives | [wt.-%] | 0.25 | 0.25 | 0.25 | 0.25 |

H-PP1 is the commercial unimodal propylene homopolymer B-Powder-10 of Borealis AG having a melt flow rate $MFR_2$ (230° C.) of about 0.3 g/10 min, a Tm of 162° C., a Mw of 1010 kg/mol and Mw/Mn of 5.1, prepared in the presence of a Ziegler-Natta catalyst.

H-PP2 is the commercial unimodal propylene homopolymer HC001A-B1 of Borealis AG having a melt flow rate $MFR_2$ (230° C.) of about 2 g/10 min, a Tm of 160° C., a Mw of 605 kg/mol and Mw/Mn of 4.5, prepared in the presence of a Ziegler-Natta catalyst.

H-PP3 is an unimodal propylene homopolymer having a melt flow rate $MFR_2$ (230° C.) of about 0.6 g/10 min, a Tm of 151° C., a Mw of 307 kg/mol and Mw/Mn of 2.9, prepared in the presence of a single-site catalyst.

H-PP4 is a propylene homopolymer of Borealis AG having a melt flow rate $MFR_2$ (230° C.) of about 20 g/10 min, a Tm of 165° C., a Mw of 180 kg/mol and Mw/Mn of 4.7, prepared in the presence of a Ziegler-Natta catalyst.

H-PP5 is an unimodal propylene homopolymer having a melt flow rate $MFR_2$ (230° C.) of about 32 g/10 min, a Tm of 158° C., a Mw of 159 kg/mol and Mw/Mn of 3.3, prepared in the presence of a single-site catalyst.

H-PP6 is an unimodal propylene homopolymer having a melt flow rate $MFR_2$ (230° C.) of about 2.8 g/10 min, a Tm of 153° C., a Mw of 274 kg/mol and Mw/Mn of 3.6, prepared in the presence of a single-site catalyst.

H-PP7 is an unimodal propylene homopolymer having a melt flow rate $MFR_2$ (230° C.) of about 3.5 g/10 min, a Tm of 157° C., a Mw of 230 kg/mol and Mw/Mn of 3.5, prepared in the presence of a single-site catalyst.

NA is the commercial nucleating agent aluminium-hydroxy-bis[2,2'-methylene-bis(4,6-di-t-butylphenyl) phosphate], NA-21, of Adeka Corporation.

Talc is the commercial product Jetfine 3CA of Imerys Talc Austria having an average particle size ($d_{50}$) of 1.2 μm.

Additives include 0.2 wt.-% of Irganox B225 (1:1-blend of Irganox 1010 (Pentaerythrityltetrakis(3-(3',5'-di-ter.t.butyl-4-hydroxytoluyl)-propionate and tris (2,4-di-t-butylphenyl) phosphate) phosphite) of BASF AG, Germany) and 0.05 wt.-% calcium stearate.

The mechanical characteristics of the inventive examples IE1 to IE4 and of comparative examples CE1 to CE6 are indicated in table 4 below.

TABLE 4

Characteristics of the prepared polypropylene (PP) compositions

|  |  | CE1 | CE2 | CE3 | CE4 | CE5 | CE6 | IE1 | IE2 | IE3 | IE4 |
|---|---|---|---|---|---|---|---|---|---|---|---|
| polypropylene (PP) homopolymer |  |  |  |  |  |  |  |  |  |  |  |
| HDT B | [° C.] | 90 | 89 | 86 | 85 | 85 | 92 | 90 | 95 | 92 | 92 |
| XCS | [wt.-%] | 2.4 | 2.5 | 0.6 | 2.7 | 2.7 | 0.5 | 0.3 | 0.4 | 0.5 | 0.5 |
| Isotactic triad fraction | [%] | 97.5 | 95.2 | 99.6 | 97.8 | 97.8 | 99.7 | 99.4 | 99.6 | 99.7 | 99.7 |
| <2.1> defects | [%] | nd | nd | 0.89 | nd | nd | 0.34 | 0.73 | 0.45 | 0.34 | 0.34 |
| Flexural modulus | [MPa] | 1550 | 1420 | 1213 | 1367 | 1367 | 1468 | 1522 | 1601 | 1468 | 1468 |
| polypropylene (PP) composition |  |  |  |  |  |  |  |  |  |  |  |
| $MFR_2$ | [g/10 min] | 0.3 | 2.44 | 0.6 | 22 | 33 | 32 | 2.5 | 3.3 | 28 | 22 |
| Tc | [° C.] | 128 | 128 | 123 | nd | 118 | 114 | 124 | 127 | 123 | 126 |
| Tm1 | [° C.] | 166 | 166 | 152 | nd | 165 | 158 | 156 | 160 | 156 | 157 |
| Tm2 | [° C.] | nd | nd | 139 | nd | nd | nd | 143 | nd | nd | nd |
| Hm1 | [J/g] | 69 | 77 | 68 | nd | 102 | 99 | 71 | 75 | 89 | 42 |
| Hm2 | [J/g] | nd | nd | 1.3 | nd | nd | nd | 2 | nd | nd | nd |
| HDT A | [° C.] | 76 | 74 | 77 | nd | 50 | 55 | 80 | 81 | 77 | 90 |
| HDT B | [° C.] | 127 | 128 | 127 | 130 | 85 | 92 | 132 | 133 | 125 | 142 |
| HDT B (limit) | [° C.] | 131 | 131 | 131 | 131 | 80 | 80 | 131 | 131 | 113 | 129 |
| Tm/HDT A |  | 2.2 | 2.2 | 2.1 | nd | 3.3 | 2.9 | 2.0 | 2.0 | 2.0 | 1.7 |
| Flexural modulus | [MPa] | 4125 | 3898 | 3723 | 3056 | 1367 | 1468 | 4017 | 4112 | 2850 | 5978 |

It can be gathered from the data set out in table 4 that the stiffness of the polypropylene (PP) composition is low if the melting temperature of the polypropylene (PP) homopolymer being polymerized in the presence of a single-site catalyst is low (see CE3). If the melting temperature of the polypropylene (PP) homopolymer is ≥153° C., then the stiffness of the polypropylene (PP) composition is similar to that of a composition comprising a polypropylene (PP) homopolymer being polymerized in the presence of a Ziegler-Natta catalyst. In particular, it can be gathered that a polypropylene (PP) composition comprising a polypropylene (PP) homopolymer being polymerized in the presence of a single-site catalyst and having a melting temperature of ≥153° C. is advantageous over the same polypropylene (PP) composition comprising a polypropylene (PP) homopolymer being polymerized in the presence of a single-site catalyst but having a melting temperature of <153° C. or a polypropylene (PP) homopolymer being polymerized in the presence of a Ziegler-Natta catalyst.

The invention claimed is:

1. A polypropylene (PP) composition consisting of:
   a) 50.0 to 95.0 wt. %, based on the total weight of the polypropylene (PP) composition, of a polypropylene (PP) homopolymer that is prepared in the presence of a single-site catalyst and having:
      i) a melt flow rate $MFR_2$ (230° C.) measured according to ISO 1133 in the range of 1 to 200 g/10 min,
      ii) a melting temperature ($T_m$) measured by differential scanning calorimetry (DSC) of ≥153° C., and
      iii) a molecular weight distribution Mw/Mn measured according to ISO 16014 in the range of 3.6 to 4.5,
   b) 5.0 to 50.0 wt. %, based on the total weight of the polypropylene (PP) composition, of a mineral filler,
   c) up to 2.0 wt. %, based on the total weight of the polypropylene composition, of one or more additives selected from the group consisting of acid scavenger, colorants, pigments, anti-scratch agents, dispersing agents, UV stabilizers, antistatic agents, demoulding agents and carriers,
   d) optionally from 0.002 to 1.5 wt. %, based on the total weight of the polypropylene composition, of a nucleating agent comprising a phosphate-based α-nucleating agent, and
   e) optionally further polymer(s) different to the polypropylene (PP) homopolymer in an amount not exceeding in total 2.0 wt. %, based on the total weight of the polypropylene (PP) composition, wherein the further polymer(s) different to the polypropylene homopolymer is/are carrier polymer(s) for additives.

2. The polypropylene (PP) composition according to claim 1, wherein the polypropylene (PP) homopolymer is unimodal.

3. The polypropylene (PP) composition according to claim 1, wherein the polypropylene (PP) homopolymer has
   a) a melt flow rate $MFR_2$ (230° C.) measured according to ISO 1133 in the range of 2 to 100 g/10 min, and/or
   b) a melting temperature ($T_m$) measured by differential scanning calorimetry (DSC) in the range from 153 to 165° C., and/or
   c) a heat deflection temperature HDT B measured in accordance with ISO 75 at a load of 0.46 MPa of at least 90° C.

4. The polypropylene (PP) composition according to claim 1, wherein the polypropylene (PP) homopolymer has:
   a) a xylene cold soluble fraction (XCS) determined at 23° C. according ISO 16152 of equal or below 2.0 wt. %, and/or
   b) a weight average molecular weight (Mw) measured according to ISO 16014 in the range from 80 to 500 kg/mol, and/or
   c) an isotactic triad fraction (mm) determined from 13C-NMR spectroscopy of at least 98.0%, and/or
   d) a content of <2,1> erythro regiodefects as determined from 13C-NMR spectroscopy in the range from 0.10 to 1.00 mol. %.

5. The polypropylene (PP) composition according to claim 1, wherein the polypropylene (PP) homopolymer has a flexural modulus measured according to ISO 178 of at least 1300 MPa.

6. The polypropylene (PP) composition according to claim 1, wherein the mineral filler is an anisotropic mineral filler.

7. The polypropylene (PP) composition according to claim 1, wherein the mineral filler has a particle size $d_{50}$ in the range from 0.1 to 10 μm.

8. The polypropylene (PP) composition according to claim 1, wherein the polypropylene (PP) composition has:
   a) a melt flow rate $MFR_2$ (230° C., 2.16 kg) measured according to ISO 1133 in the range from 0.5 to 175 g/10 min, and/or
   b) a melting temperature ($T_m$) measured by differential scanning calorimetry (DSC) in the range from 154 to 165° C., and/or
   c) a crystallization temperature ($T_c$) measured by differential scanning calorimetry (DSC) in the range from 120 to 135° C., and/or
   d) a flexural modulus measured according to ISO 178 in the range from 2700 to 6500 MPa, and/or
   e) a heat deflection temperature (HDT) measured according to ISO 75 A at a load of 1.8 MPa in the range of 76 to 95° C.

9. The polypropylene (PP) composition according to claim 1, wherein the polypropylene (PP) composition has a ratio of melting temperature ($T_m$) measured by differential scanning calorimetry (DSC) to heat deflection temperature (HDT) measured according to ISO 75 A [$T_m$/HDT] of ≤2.0.

10. An article comprising the polypropylene (PP) composition according to claim 1.

11. The article according to claim 10, wherein the article is an automotive interior article.

* * * * *